Patented Aug. 13, 1940

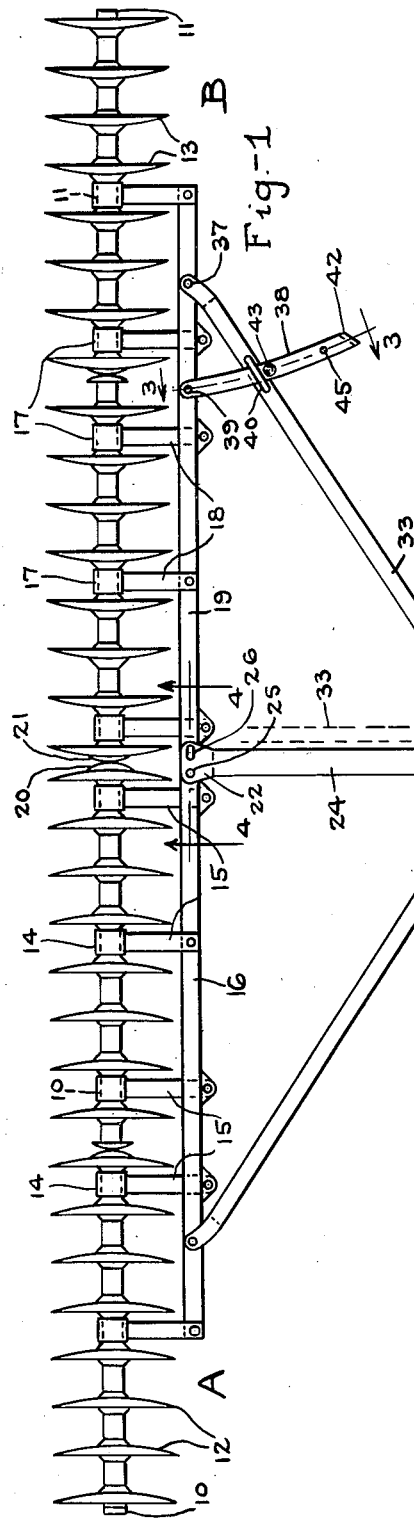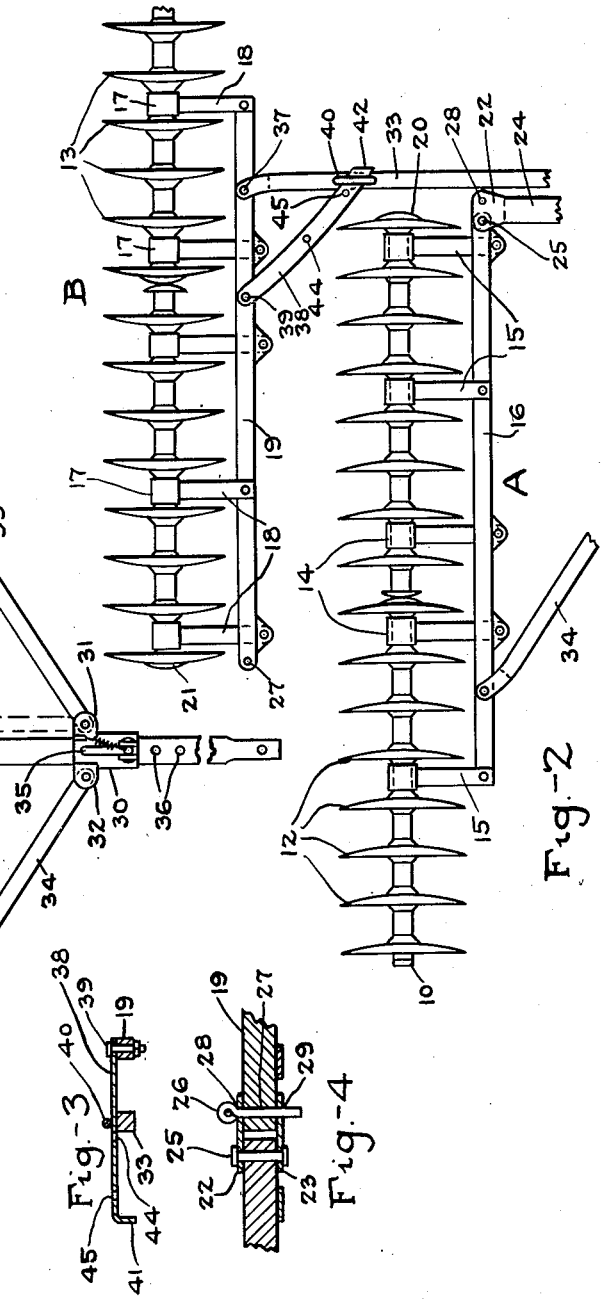

2,211,560

UNITED STATES PATENT OFFICE 2,211,560

FOLDABLE DISK HARROW

Albert O. Espe, Crookston, Minn.

Application January 31, 1940, Serial No. 316,552

5 Claims. (Cl. 55—81)

My invention relates to a foldable disk harrow and has for its object to provide for a harrow comprising two sections or gangs, slidable bar means connecting the gangs in the system, whereby one of the gangs may be caused to be folded so that it will mainly travel back of the other gang.

My invention has to do primarily with disk harrows which are very wide and adapted to be drawn by tractors. The width of such harrows may be as great as up to thirty-one feet, or wider. It will be obvious that such a construction may be too wide to be drawn through gates or narrow lanes or other narrow places. In my Patent No. 2,114,049, dated April 12, 1938, I have disclosed a means for folding one gang of such a wide disk harrow back of the other so as to permit the movement of the wide harrow through such narrow openings. My present invention is an improvement upon the aforesaid patent, which has for its object to cause the automatic folding backward and movement forward of the separable disk gang which folds behind the other disk gang to be effected by means of a sliding bar arrangement which produces effective timed movement of one disc gang relative to the other.

It is a principal object of my invention, therefore, to arrange two gangs of a disk harrow connected to a drawbar so as to move together or angularly by means of center and brace bar members, and to provide in conjunction with one of said bar members a sliding bar so pivoted to one of the gangs that when that gang is released from the center drawbar the sliding bar member will hold it for normal swinging rearward movement to fold behind the other gang.

It is a further object of my invention to make the above arrangement such that the folded gang will upon turning and backing of the disk harrow automatically be held to return to cooperative relation with the other gang.

The full objects and advantages of my invention will appear in connection with the detailed description thereof, and the novel features by which the aforesaid advantageous results are obtained will be particularly pointed out in the claims.

In the drawing illustrating an application of my invention in one form:

Fig. 1 is a top plan view of a wide disk harrow in normal extended position ready for full width harrowing operation.

Fig. 2 shows the same harrow with one of its gangs folded behind the other.

Fig. 3 is a sectional view taken on line 3—3 of Fig. 1.

Fig. 4 is a sectional view taken on line 4—4 of Fig. 1.

As shown, two disk harrow gangs, designated generally as A and B, are provided comprising independent axle supports 10 and 11 upon which are mounted a multiplicity of harrow disks 12 and 13. The axle member 10 is supported upon hubs 14 formed in conjunction with arms 15 which are connected with a frame bar 16. The axle 11 likewise is journaled in a multiplicity of hubs 17 on arms 18 which are connected with a frame bar 19. The axle 10 has formed on its inner end a rounded bearing head 20 cooperating with a similar rounded bearing head 21 on the end of axle 11. The frame piece 16 is bolted to the two straps 22 and 23 of a clevis structure formed on the end of a drawbar 24 by means of a riveted bolt 25. The frame bar 19 likewise is adapted to extend between the clevis strips 22 and 23 of drawbar 24 and be secured thereto by a removable pin 26, Fig. 4, which passes through a hole 27 in the frame member 19. The pin 26 goes through bolt holes 28 and 29 in clevis members 22 and 23, as clearly shown in Fig. 4, but is readily removable.

Upon the drawbar 24 is mounted a slide 30 provided with ears 31 and 32 to which are pivoted angularly-disposed brace bars 33 and 34. The slide 30 is secured by a hook pin 35 to the bar 24, and in the position shown in Fig. 1 holds the two gangs A and B in substantial alinement. Additional holes 36 in the drawbar 24 are employed for securing the slide 30 in different adjusted positions, which will have the result of drawing, through angular brace bars 33 and 34, the outer ends of the gangs toward each other, this action being permitted by the engagement of rounded heads 20 and 21 and the multiple bolt holes 36.

From the above it will be apparent that the two gangs A and B may be separated at their point of connection to the clevis members 22 and 23 simply by withdrawing the bolt 26, and when that is done and the harrow is moved forward the inner end of gang B will move away from the inner end of gang A and gang B will swing on its pivotal connection 37 with brace bar 33.

In order to control this movement, which is a folding action designed to bring gang B very largely back of gang A and narrow the entire harrow so that it may be driven through gates, alleys and the like which are not wide enough to permit the harrow to pass at full width, I provide a special arcuate bar 38 which is pivoted at 39 to the frame piece 19 at a point between pivot 37 and brace bar 33 and the inner end of gang B, but quite close to pivot 37. This arcuate bar 38 rides on the top of brace bar 33 and slides under a keeper 40, see Figs. 1 and 3, secured upon the top of brace bar 33. The bar 38 is provided with a flange lip 41 at its end which is angularly-disposed, as clearly indicated at 42, in Figs. 1 and 2. A pin 43 is adapted to be set back of brace bar 33 through a hole 44, Fig. 3, when gang B is extended relative to gang A for full width operation. When the pin 26 is withdrawn the pin 43 will also be withdrawn, and as the harrow moves ahead the gang B will swing on pivot 37 until the lip 41 is brought in contact with the side of bar 33, as shown in Fig. 2. The pin 43 will then be dropped through a second hole 45 in front of bar 33, as shown in Fig. 2, at which time gang B will have been folded back of gang A with brace bar 33 parallel with drawbar 24, and gang B held from oscillating on pivot 37 by reason of the locking of arcuate bar 38 between brace bar 33 and frame piece 19 because of the insertion of pin 43 in opening 45 at the side of brace bar 33, as shown in Fig. 2.

The insertion of pin 43 is not necessary when the harrow is traveling ahead, as the lip 41 will engage the outside of brace bar 43, as clearly shown in Fig. 2, in which position the disk gang B will trail behind disk gang A. When, however, it is desired to fold disk gang B back into operative position relative to disk gang A for full width harrowing, the pin 43 is inserted through hole 45 against the inside of brace bar 33. When the parts are in this position the gang A may be turned relative to gang B both by swinging the drawbar 24 and then by backing. Because of the locking effect of arcuate bar 38 with pin 43 through it this will cause gang B to swing away from gang A until the bumper head 21 thereof is in position to be brought into alinement, by further backing, with bumper head 20 on gang A. When in this position, the pin 43 will be withdrawn, and further backing will cause gang A and gang B to come into alinement with bumper heads 20 and 21 in engagement. When this occurs pin 26 will be restored through clevis plates 22 and 23, and the harrow is locked together for full width operation.

It may happen, however, that backing does not bring the gang B into alinement with gang A with the bumper heads in contact, in which case pin 43 is inserted through hole 44 on the outside of brace bar 33. When the harrow is driven ahead this will hold the gang B at exactly the same angle to brace bar 33 as gang A is held to brace bar 34 and will automatically bring the two gangs into alinement with bumpers engaging, to be connected together by pin 26. Also pin 43 will be extended through hole 44 while the harrow is being operated already for further shifting when the folding operation is again undertaken.

The advantages of my invention will be apparent from the foregoing description. By use of the rigid arcuate locking bar 38 in combination with the separable disk gangs A and B, and with proper use of the pins 43 and 26, the folding of disk gang B back of disk gang A may be affected automatically and with ease, simplicity and certainty, and very quickly. After the harrow has been drawn from the farm yard and out on the field it may be restored to full width operative arrangement with the same automatic ease and dispatch.

These advantages have been abundantly demonstrated by extensive use in the field. They render practical the use of extremely wide disk harrows in the field and the ready moving of such harrows from the storage shed and farm yard to the field and back to the storage shed.

I claim:

1. A wide disk harrow embodying a drawbar, two gangs of disks connected at their inner ends to said drawbar, the connection to one of said gangs being removable, a brace bar pivotally connected both with the drawbar and with one disk gang, a locking bar slidably mounted on said brace bar and pivotally connected with the last-named disk gang, and means on the locking bar cooperating with the brace bar whereby when the last-named disk gang is released from the drawbar the locking bar in conjunction with the brace bar will hold said last-named disk gang to fold back of the other disk gang parallel thereto with the brace bar parallel with the drawbar so the two disk gangs may be moved together in tandem to pass through narrow openings.

2. A wide dask harrow embodying a drawbar, two gangs of disks connected at their inner ends to said drawbar, the connection to one of said gangs being removable, a brace bar pivotally connected both with the drawbar and with one disk gang, a locking bar slidably mounted on said brace bar and pivotally connected with the last-named disk gang, a keeper on the brace bar restraining swinging movement of the locking bar, and a projection on the locking bar adapted to engage a side of the brace arm, whereby when the last-named disk gang is released from the drawbar said projection will engage a side of the brace bar and hold said last-named disk gang folded back of the other disk gang parallel thereto with the brace bar parallel with the drawbar so that the two disc gangs may be moved together in tandem to pass through narrow openings.

3. A wide disk harrow embodying a drawbar, two gangs of disks connected at their inner ends to said drawbar, the connection to one of said gangs being removable, a brace arm pivotally connected both with the drawbar and with one disk gang, an arcuate locking bar slidably mounted on said brace bar and pivotally connected with the last named disk gang, a keeper on the brace bar embracing said locking bar and restraining swinging movements thereof, a lip on the locking bar adapted to engage the outside of the brace bar, whereby when the last named disk gang is released it will be held folded back of the other disk gang parallel thereto with the brace bar parallel with the drawbar so the two disk gangs may be moved together in tandem to pass through narrow openings, and means cooperating with the locking bar and the brace bar to hold said last named disk gang in fixed relation to the brace bar during backing of the harrow to permit the last named disk gang then to swing relatively to the first disk gang to a position where the two disk gangs may be brought into alinement and the released disk gang be reconnected with the drawbar.

4. A wide disk harrow embodying a drawbar, two gangs of disks connected at their inner ends to the drawbar, the connection to one of said gangs being removable, a brace bar pivotally connected both with the drawbar and with one disk gang at a point toward the outer end thereof, a locking bar slidably mounted on said brace bar and pivotally connected with the last named disk gang, means on said brace bar restraining the locking bar from swinging movements, said brace bar having formed therethrough a multiplicity of holes, and a bolt normally carried in one of said holes and adapted to be inserted through a selected one of said holes to hold the last-named gang locked for operation when it is released from the drawbar connection and folded back to follow the first named disk gang.

5. A wide disk harrow embodying a drawbar, two gangs of disks connected at their inner ends to the drawbar, the connection of one of said gangs being removable, a pair of brace bars each connected both with the drawbar and with the respective gangs at points toward the outer ends thereof so as to make the same angles with said gangs when the harrow is held extended for operation, a locking bar slidably mounted on one of said brace bars and connected with the disk gang to which said last-named brace bar is connected, means on said last-named brace bar restraining the locking bar from swinging movement, said brace bar having formed thereon a pair of holes and a bolt normally carried in one of said holes and adapted to be inserted through a selected one of said holes to hold said last-named gang extended at the same angle with its brace bar as the other angle of the other gang to its brace bar so that when the two gangs are separated when one of said gangs has been released from the drawbar forward operation of the grader will cause the two gangs to come into alinement with their bumpers engaging.

ALBERT O. ESPE.